Sept. 30, 1941.   A. L. WAUGH   2,257,141
SURGICAL KNIFE
Filed Dec. 16, 1938
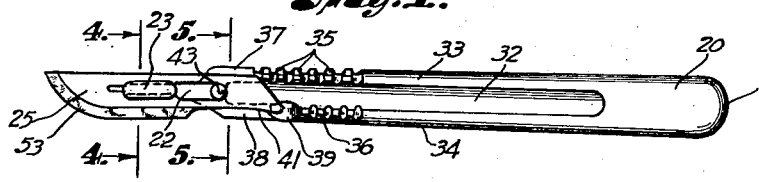
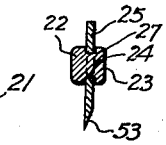
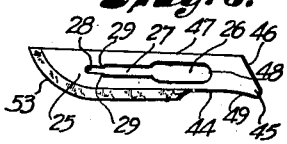
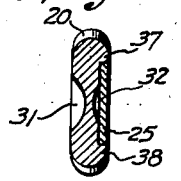
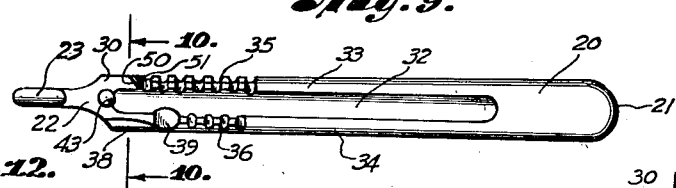
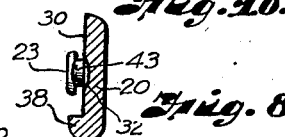
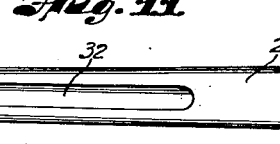
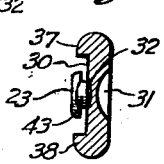
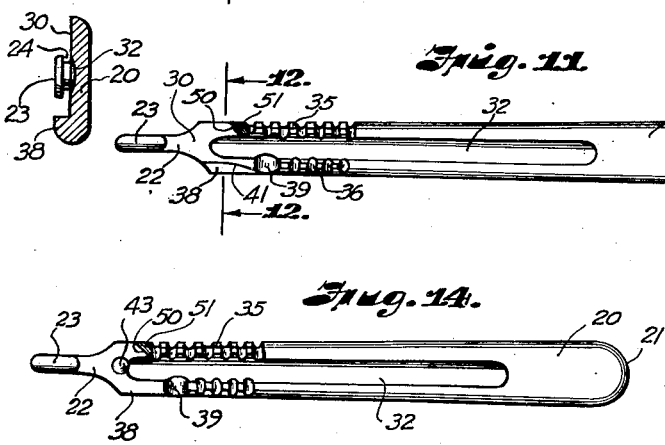
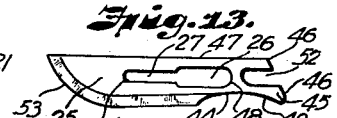
INVENTOR
Arthur L. Waugh
BY Alfred R. Fuchs
ATTORNEY Patented Sept. 30, 1941

2,257,141

UNITED STATES PATENT OFFICE 2,257,141

SURGICAL KNIFE

Arthur L. Waugh, Chicago, Ill.

Application December 16, 1938, Serial No. 246,152

10 Claims. (Cl. 30—339)

My invention relates to surgical knives, and more particularly to a knife comprising a handle and detachable blade.

It is one of the purposes of my invention to provide a knife of the above mentioned character, that is so constructed that the detachable blades used in combination with the handle of my invention will be easily engageable in position on the handle and readily removable therefrom and will be held in a fixed position on the handle when properly interlocked therewith.

Much difficulty is experienced in surgical knives having detachable blades that are at present in use, due to the play between the blade and the handle. Also much difficulty is experienced with handles in common use, when damaged, as by dropping, when the operator endeavors to attach blades to or to remove them from bent handles; a hazard that is increased by the presence of a very sharp cutting edge on the blade and further by the requirements of a sterile technique throughout the procedure. It is a purpose of my invention to overcome these obstacles by the construction of my improved handle.

It is a further purpose of my invention to provide a handle that so detachably receives a blade that it will not become stuck on the handle in such a manner that the blade would be easily broken when an attempt is made to remove it from the handle. The handle that I have invented is so constructed that the rear edge of the blade can be lifted out of interlocking engagement with the means provided for locking on the handle, and moved forward relative to the handle by a straight forward movement to disengage the blade from the holding means on the handle. The enlargement of the blade with the handle is also accomplished by a straight line rearward movement of the blade on the handle, with suitable formations for such interlocking on the handle, the blade, due to the inherent flexibility thereof, snapping into interlocking engagement therewith when it reaches the proper position therefor.

It is another important purpose of my invention to provide a handle for a detachable blade, that is so interlocked with the blade when a blade is associated therewith that the blade will be rigid with the handle forming a surgical knife that will have as much rigidity as those that do not have detachable or separable blades.

Another purpose of my invention is to provide a safer means of mounting blades and of removing same from their handles, to overcome the danger of cutting fingers of the operators, a risk that is always present in the usual form of detachable blades. Means will be shown herein later that is provided to make the easy removal of these blades possible with either the thumb and index finger of the nurse or physician, or by the use of common surgical forceps, thus protecting the operator. Such means is particularly desirable because of the condition of the knives after surgical operating, when ordinarily they are smeared with tissues, such as coagulated blood and serum, that act as a glue to hold the blades fast in their close-fitting engagement with their handles. Many blades have been broken; many have been contaminated in use, and cuts of a serious nature, sometimes infected by contact with pus, are a constant source of danger resulting from injuries received by operators while trying to remove sticking blades from their handles. My invention provides means to permit the safe manipulation of the blades.

By providing a grooved portion in my improved handle that passes under the rear edge of the blade, the blade can be readily disengaged from the handle, and due to the formation of the particular interlocking means utilized on my handle, it is possible to make a much shorter projecting portion of reduced size, with which the blade engages, than in such handles as have been previously used, and furthermore the blade does not have to be raised to as great an extent as has been necessary with other interlocking formations on handles, so that the same does not have to be flexed as greatly and is more easily detachable than has been true with handles used prior to my invention.

Other objects and advantages of my invention will appear as the description of the drawing proceeds. I desire to have it understood, however, that I do not intend to limit myself to the particular details shown or described, except as defined in the claims.

In the drawing:

Fig. 1 is a side elevation of one of my improved surgical knives, showing the blade in position on the handle.

Fig. 2 is a view similar to Fig. 1, of the handle portion with the blade removed therefrom.

Fig. 3 is an elevational view of the handle as viewed along one side edge thereof.

Fig. 4 is a section on an enlarged scale, taken on the line 4—4 of Fig. 1.

Fig. 5 is a section on an enlarged scale, taken on the line 5—5 of Fig. 1.

Fig. 6 is a face view of a blade usable with my handle, detached.

Fig. 7 is an edge view of the blade.

Fig. 8 is a section on an enlarged scale, taken on the line 8—8 of Fig. 2.

Fig. 9 is a view similar to Fig. 2, of a modified form of handle.

Fig. 10 is a section on an enlarged scale, taken on the line 10—10 of Fig. 9.

Fig. 11 is a view similar to Fig. 2, of a further modification.

Fig. 12 is a section on an enlarged scale, taken on the line 12—12 of Fig. 11.

Fig. 13 is a face view of a modified form of blade, and

Fig. 14 is a view similar to Fig. 2 of a further modification.

Referring in detail to the drawing, in Figs. 1 to 4, inclusive, and Fig. 5, is shown a handle 20, which tapers slightly from the rear end 21 thereof toward the forward end thereof. At the forward end of the handle a reduced forward extension 22 is provided thereon. At the extreme forward end of said reduced extension 22 is a lateral projection, or enlargement, 23, which is elongated in the direction of the handle and which is grooved out at 24 to provide slots, or narrow grooves, on opposite sides of said projections, thus forming a button-like member on the end of said reduced extension 22, which is adapted to receive the blade 25 in a manner to be described below.

The slots, or narrow grooves, 24 extend around the forwardmost end of the elongated lateral projection, or button portion, 23, forming inwardly curved forward end portions of said slots, and the blade 25 is provided with a slot having a portion of greatest width 26, a portion of intermediate width 27, and a portion of least width 28. The button-like projection 23 is adapted to engage with the blade 25 in such a manner that the edges of the slot portion 27 are fitted in the grooves 24 and the rounded portions 29 of the edges of the slot in the blade engage around the curved forward end of the projection 23 in the slotted portion 24 when the blade is in its final position. A button-like member 23, of similar character, has been used previously in conjunction with a blade, such as shown in Fig. 6, but due to the character of the elongated button-like member 23 previously utilized, the reduced extension 22 had to be much longer than is the case in my improved handle member, and consequently, a rather weak structure resulted, that was easily damaged by bending or breaking off the extension 22. Also the rigidity, necessary for the successful use by a surgeon of such a knife, does not exist in a knife that has a detachable handle portion, which has a long reduced extension on the forward end thereof, due to the fact that said extension is liable to bend or flex under the pressure necessary in the use of the knife in performing surgical operations. By modifying the type of button utilized on the extension, and using this in conjunction with other locking means that will be described below, this difficulty is avoided. The blade 25 is stiffened when used with my handle, due to the fact that the portions 29 thereof fit in the slots 24 at the curved forward ends of said slots.

The main body portion of the handle is provided with a flat faced forward end portion 30 at the junction of the reduced forward extension 22 therewith, and extending rearwardly therefrom a limited distance. Also the face of the reduced extension 22 is flat on the side thereof on which the projection 23 is provided, from its junction with the main body portion of the handle to said projection 23. The wall of the groove, or slot, 24, which is remote from the top face of the button, or projection, 23 is in alignment with the flat face on the extension 22 and the flat face 30 on the main body portion of the handle.

The main body portion of said handle is provided with a longitudinally extending groove 31 on the side thereof, and a similar longitudinally extending groove 32 on the other side thereof. Said grooves 31 and 32 are of substantially equal extent and the groove 32 runs into, or intersects, the flat face 30 at its forward end and extends rearwardly to a point spaced a short distance from the rear end 21 of the handle 20. The grooves 31 and 32 not only reduce the weight of the handle and balance the same better than would be the case otherwise, but the groove 32 also performs an important function in the removal of a blade from the handle, when this is desired. A pair of ribs 33 and 34 is provided on each side of the handle due to the groove 32 therein, and said ribs are provided with transverse grooves forming a series of corrugations 35 and 36 on said handle at the forward ends of the ribs, the corrugations 35 extending around the edge of the handle from one of the ribs 33 to the rib on the other side of the handle, as will be evident from Fig. 2.

In the form of handle shown in Figs. 1 to 5, inclusive, a tapering rib, or flange, 37 is provided beyond the corrugations 35 at one side of the flat portion 30 and substantially in alignment with the rib 33, said rib 37 lying to one side of the forward end of the groove 32. Substantially directly opposite the rib 37 is a rib, or projection, 38. Said rib, or projection, 38 lies adjacent the side edge of the main body portion of the handle that is provided with the rib 34, and is substantially in alignment with said rib 34, lying forwardly of the corrugations 36 and being spaced therefrom by a transverse groove 39, which intersects and merges with the longitudinal groove 32, said groove 39 providing a passage extending from the groove 32 out through the edge of the handle that is bottom-most in Figs. 1 and 2. The edge of the rib 38 that is innermost converges slightly toward the rib 37 at the forward end 40 thereof backwardly for a short distance and then curves outwardly toward the side edge of the handle, as indicated at 41, to taper down substantially to a point at its juncture with the transverse groove 39. Said rib, or projection, 38 also inclines slightly upwardly from its forward end to substantially the point where the curved edge 41 meets the inwardly converging edge 40 and inclines downwardly at its rear end, as indicated at 42, to run into the groove 39.

Projecting from the flat face 30, substantially centrally thereof, slightly rearwardly of the junction of the main body portion with the reduced extension 22, and immediately forward of the forward end of the groove 32, is a projection, or button, 43, which extends above the flat face 30 a much less distance than the button 23. The top surface of the button, or projection, 43 inclines upwardly from front to rear thereof, as will be evident from Fig. 3. The blade, such as that shown in Fig. 6, it will be noted, not only has the slot made up of the portions 26, 27 and 28, but also has a cut away portion at 44 terminating in a laterally projecting heel portion or lateral projection 45 and has an obliquely extending rear edge 46, the top edge of the blade 47, or that opposite the cutting edge 53, being substantially straight.

When a blade, such as that shown in Fig. 6, for example, is to be assembled with the handle shown in Figs. 1 to 5, inclusive, and Fig. 8, the slot portion 26 is first aligned with the elongated projection, or button, 23, said button being passed through the opening formed by the slot portion 26. The blade is then slid rearwardly with the side edges of the slot portion 27 in the grooves, or slots, 24 and as this proceeds the rear edge 46 of the blade is lifted by the inclined top face of the projection 43 and the inclined top surface of the rib 38, so as to be flexed upwardly away from the flat face 30. Rearward sliding movement of the blade continues until the heel portion or lateral projection 45 passes beyond the projection 38, at which time the button 43 is in such position that it snaps into the rear end 48 of the slot 26. The curved edge 41 of the projection 38 will then be in engagement with the curved edge portion 49 of the blade 25 and the portions 29 of the slot in the blade will be substantially in engagement with the forward rounding ends of the grooves 24 in the projection 23, and said blade will be held substantially in fixed position on the handle. Furthermore, the top substantially straight edge 47 of the blade will be in face to face engagement with the inner wall of the rib, or projection, 37 and the blade will be held from any twisting, or pivoting, movement on the projections with which it is interlocked.

In order to remove the blade readily the groove 32 is provided. If forceps are available, the rear inclined edge of the blade is engaged by the forceps, flexing the blade so that the heel portion thereof can be raised over the inclined rear portion 42 of the projection 38, and the blade slid forwardly on the projection 23 so as to disengage the blade from the button 43 and the projection 38, so that the rear end portion of said blade rests on top of said projections. Then the blade can be grasped at its forward end and readily removed by a forward pull thereon. If forceps are not available, any sharp object, even the finger nail, can be inserted under the blade, either in the groove 32 or the transverse groove 39, so as to flex and lift the rear, or heel, portion of the blade, at the same time giving a forward push to the same, so as to disengage said blade from the projection 38 and button 43 in the same manner as previously described. Due to the wedging action of the inner faces, or walls of the ribs 37 and 38 facing each other, because of their inclination, these will aid in aligning the blade properly and firmly fixing the same in position.

While the form of the invention shown in Figs. 1 to 5, inclusive, and Fig. 8, is preferred, very good results can be obtained approximating those above described, by using the modified form of handle shown in Figs. 9 and 10. Said handle is provided with the main body portion 20 and the reduced forward extension 22, made substantially in the same manner as previously described, is provided thereon. Said reduced extension has the button-like elongated projection 23 thereon, which is made in the same manner as said projection previously described, and the handle has the longitudinal groove 32 therein, which is arranged in the same manner as previously described, extending into the flat wall portion 30 and providing the ribs 33 and 34, which are provided with the corrugations 35 and 36, as in the form of the invention previously described.

A transversely extending groove 39 intersects the groove 32 in the same manner as previously described, and the projection 38 is made in the same manner as previously described and operates in the same manner as was previously described. Also the button-like projection 43 is provided in the same location and operates in the same manner as was described in connection with the form of the invention shown in Figs. 1 to 5, and Fig. 8. The rib, or projection, 37 is, however, omitted and instead of said rib, or projection, the inclined shoulder 50 is provided forwardly of the corrugations 35 at the forward end of the rib portion 33, said rib portion being also beveled off on the top surface 51 thereof, so that the inclined shoulder 50 is of much less height than the rib portion 33, being only slightly higher than the thickness of the blade 25.

The blade is put in place on the handle in substantially the same manner as previously described, but in the case of the handle shown in Figs. 9 and 10, the inclined rear edge 46 of the blade engages the inclined shoulder 50 and the rib, or projection, 38 engages with the blade in the same manner as previously described, as does also the button-like member 43. The beveled top face 51 on the forward end of the rib causes the blade to readily move into position in engagement with the inclined shoulder 50, and when the blade is in its final position it will be held between said inclined shoulder 50 and the projection 43 and the rib, or projection, 38, so as to be firmly fixed in position. The blade is removed in the same manner as previously described in connection with the handle shown in Figs. 1 to 5, inclusive, and Fig. 8.

A further modification is shown in Figs. 11 and 12. The only difference in the construction of the device shown in Figs. 11 and 12 from that shown in Figs. 9 and 10 is that the button-like projection 43 is omitted. Otherwise the parts are the same as shown in Figs. 9 and 10 and the same reference numerals are applied to the corresponding parts in these two figures. The inclined top face of the projection 38 is relied on in the form of handle shown in Figs. 11 and 12, to guide the heel portion of the blade over said projection and into interlocking engagement therewith. The blade is held against rearward movement relative to the handle by engagement of the inclined shoulder 50 with the inclined rear edge 46 of the blade, and is held from forward movement by engagement of the heel portion or lateral projection 45 back of the projection, or rib, 38 and the blade will thus be held in fixed position on the handle, even though the projection 43 is omitted. However, there is more liability of the blade becoming accidentally disengaged if the projection 43 is omitted, as shown in Figs. 11 and 12, as it does not require as much upward flexing of the heel portion of the blade to disengage the same from the handle in this form of the invention as in that shown in Figs. 9 and 10. Also a closer fit between the blade and the projection 38 and inclined shoulder 50 is required where the projection 43 is omitted, than would be the case with a projection 43 provided as shown in Figs. 9 and 10.

It may be found desirable to provide the rear edge portion of the blade with a greater degree of flexibility than is possible with the form of blade shown in Fig. 6, and the forward end with more rigidity than the blade shown in Fig. 6. In order to provide for greater flexibility in that portion of the blade that has to be flexed upwardly to release the blade from the handle, the blade may be cut away at its rear edge to provide an opening, or recess, 52 extending inwardly from the inclined rear edge 46 a substantial distance, as shown in Fig. 13. This will give the blade great flexibility, particularly at the heel portion thereof, and as part of the heel portion will project over the groove 32, it can be readily grasped to flex the same out of engagement with the rear side of the projection, or rib, 38. The forward end of the blade can be stiffened by eliminating the slot portion 28 and having the curved forward end 29' of the slot portion 27 engage the curved forward end of the slot 24, providing a better contact between said blade and the projection 23.

Another form of handle is shown in Fig. 14. The handle shown in Fig. 14 is made just like the handle shown in Figs. 9 and 10, except that the projection 38 is omitted. The blade, when used with the handle shown in Fig. 14, is engaged with the button 23 and slid rearwardly in the same manner as previously described, the projection 43 raising the rear end of the blade upwardly as it rides along the inclined top surface thereof until the end 48 of the slot 26 drops back of the projection 43. The blade is then interlocked with the projections 23 and 43 and in engagement with the shoulder 50. In order that the blade is held fixed on the handle by this holding means, the slot in the blade must fit accurately so that the portions 29 or 29' of the blade engage the forward curved portions of the slot 24 at the same time that the edge 48 engages the back side of the projection 43. The blade is removed from this handle in the same manner as previously described, the blade being lifted high enough at its rear end to clear the projection 43, instead of the projection 38.

What I claim is:

1. In a knife of the character described, a longitudinally slotted blade having a lateral enlargement adjacent the rear end thereof and a handle having a reduced forward extension thereon provided with a longitudinally elongated projection thereon having interlocking sliding engagement with opposed edges of the slot in said blade, said handle having the main body portion thereof flattened at and adjacent the junction of said reduced extension therewith to receive said blade, and a projection at one side of said flattened portion interlocking with a longitudinal edge of said blade at said lateral enlargement to hold said blade in fixed position on said handle, said last mentioned projection having means thereon for camming said lateral enlargement over said last mentioned projection when said blade is slid rearwardly on said handle while interlocked with said elongated projection.

2. In a knife of the character described, a longitudinally slotted blade having a lateral enlargement adjacent the rear end thereof and a handle having a reduced forward extension thereon provided with a longitudinally elongated projection thereon having interlocking sliding engagement with opposed edges of the slot in said blade, said handle having the main body portion thereof flattened at and adjacent the junction of said reduced extension therewith to receive said blade, and means on the flattened portion of said handle engaging the opposite side edges of said blade, said slot and said lateral projection to hold said blade against lateral and longitudinal movement relative to said handle, comprising a central button-like projection, and a projection along one longitudinal edge of said handle engaging the edge of said blade at and forward of said enlargement.

3. In a knife of the character described, a handle having a main body portion and a forward extension reduced in width on said main body portion, said forward extension having a projection on one side thereof, said projection being elongated lengthwise of said extension and having blade engaging means thereon, a flat faced portion on the side of said handle having said elongated projection extending from said projection to the main body portion of said handle and a short distance rearwardly of the junction of said handle with said main body portion, and a button-like blade-locking projection extending from said flat faced portion on the same side of said handle and spaced longitudinally from said elongated projection and aligning longitudinally therewith, said button-like projection having a cam face on its upper surface.

4. In a knife of the character described, a handle having a forward extension thereon reduced in width, a blade, elongated projecting blade engaging means on said extension near the forward end thereof having means thereon interlocking with said blade, a flat faced portion on said handle extending rearwardly from said blade engaging means along said extension and into the forward end of the main body portion of said handle to provide a flat faced portion rearwardly of and wider than said extension, and a blade locking projection on the main body portion of said handle extending from one side of the wider portion of said flat faced portion adjacent a longitudinal edge of said handle, said blade locking projection and a longitudinal edge of said blade having interengaging locking formations thereon, said handle having a shallow longitudinal groove in said main body portion extending forwardly into said flat faced portion to a point opposite said locking projection under the rear edge of said blade, whereby said blade may be flexed at its rear edge to raise the same over said locking projection.

5. In a knife of the character described, a handle having a main body portion and a forward extension reduced in width on said main body portion, said forward extension having a projection on one side thereof, said projection being elongated lengthwise of said extension and having blade engaging means thereon, a flat faced portion on the side of said handle having said elongated projection extending from said projection to the main body portion of said handle and a short distance rearwardly of the junction of said handle with said main body portion, a blade-locking projection having a cam formed on its upper face and extending from the same side of said handle and spaced both laterally and longitudinally from said elongated projection and lying between one longitudinal edge of said handle and said flat faced portion and adjacent said longitudinal edge, and a rib on said main body portion extending from the same side of said handle, having a substantially straight inner edge and lying opposite said blade locking projection along the opposed longitudinal edge of said handle adjacent said flat faced portion, to confine a blade between said rib and projection.

6. In a knife of the character described, a handle having a forward extension thereon reduced in width, a blade, elongated projecting blade engaging means on said extension near the forward end thereof having means thereon interlocking with said blade, a flat faced portion on said handle extending rearwardly from said blade engaging means along said extension and into the forward end of the main body portion of said handle, a blade locking projection on the main body portion of said handle extending from one side of the wider portion of said flat faced portion adjacent a longitudinal edge of said handle, said blade locking projection and a longitudinal edge of said blade having interengaging locking formations thereon, and a rib on said main body portion having a substantially straight inner edge and lying opposite said blade locking projection along the opposed longitudinal edge of said handle adjacent said flat faced portion, said straight edge engaging the longitudinal edge of said blade opposite that having the locking formation thereon said handle having a shallow longitudinal groove in said main body portion extending forwardly into said flat faced portion to a point between said rib and said locking projection under the rear edge of said blade, whereby said blade may be flexed at its rear edge to raise the same over said locking projection.

7. In a knife of the character described, a handle having a main body portion and a forward extension reduced in width on said main body portion, said forward extension having a projection on one side thereof, said projection being elongated lengthwise of said extension and having blade engaging means thereon, a flat faced portion on the side of said handle having said elongated projection extending from said projection to the main body portion of said handle and a short distance rearwardly of the junction of said handle with said main body portion, a blade-locking projection extending from the same side of said handle spaced both laterally and longitudinally from said elongated projection and lying between one longitudinal edge of said handle and said flat faced portion and adjacent said longitudinal edge, and a button-like projection on said flat face in longitudinal alignment with said elongated projection on said extension.

8. In a knife of the character described, a handle having a main body portion and a forward extension reduced in width on said main body portion, said forward extension having a projection on one side thereof, said projection being elongated lengthwise of said extension and having blade engaging means thereon, a flat faced portion on the side of said handle having said elongated projection extending from said projection to the main body portion of said handle and a short distance rearwardly of the junction of said handle with said main body portion, a blade locking projection extending from the same side of said handle spaced both laterally and longitudinally from said elongated projection and lying between one longitudinal edge of said handle and said flat faced portion and adjacent said longitudinal edge, a rib on said main body portion extending from the same side of said handle, having a substantially straight inner edge and lying opposite said blade locking projection along the opposed longitudinal edge of said handle adjacent said flat faced portion and a button-like projection between the forward ends of said rib and blade locking projection in longitudinal alignment with said elongated projection on said extension and having a cam surface thereon.

9. In a knife of the character described, a handle having a forward extension thereon reduced in width, a blade, elongated projecting blade engaging means on said extension near the forward end thereof having means thereon interlocking with said blade, a flat faced portion on said handle extending rearwardly from said blade engaging means along said extension and into the forward end of the main body portion of said handle, and a blade locking projection on the main body portion of said handle at one side of said flat faced portion adjacent a longitudinal edge of said handle, said blade locking projection and a longitudinal edge of said blade having interengaging locking formations thereon, said handle having a shallow longitudinal groove in said main body portion extending forwardly into said flat faced portion to a point opposite said locking projection under the rear edge of said blade, and having a transverse groove extending from the longitudinal edge having said locking projection immediately to the rear of said locking projection into said longitudinal groove, the rear edge of said blade overlying said transverse groove.

10. In a knife of the character described, a longitudinally slotted blade having a lateral enlargement adjacent the rear end thereof and a handle having a reduced forward extension thereon provided with a longitudinally elongated projection thereon having interlocking sliding engagement with opposed edges of the slot in said blade, said handle having the main body portion thereof flattened at and adjacent the junction of said reduced extension therewith to receive said blade, and means on the flattened portion of said handle engaging the opposite side edges of said blade, said slot and said lateral projection to hold said blade against lateral and longitudinal movement relative to said handle, comprising a central button-like projection and a projection along one longitudinal edge of said handle engaging the edge of said blade at and forward of said enlargement, said button-like projection and said projection along said longitudinal edge being provided with means for raising the rear edge of said blade at said lateral enlargement over said last mentioned projection, when slid rearwardly on said handle with said elongated projection in engagement with said slot.

ARTHUR L. WAUGH.